United States Patent [19]

Wilkins

[11] Patent Number: 5,342,098
[45] Date of Patent: Aug. 30, 1994

[54] MULTIPLE COUPLING DEVICE

[75] Inventor: Steve Wilkins, Union City, Pa.

[73] Assignee: Snap-Tite, Inc., Union City, Pa.

[21] Appl. No.: 6,822

[22] Filed: Jan. 21, 1993

[51] Int. Cl.⁵ ............................................. F16L 35/00
[52] U.S. Cl. .................................. 285/26; 285/137.1; 285/309
[58] Field of Search .................... 285/137.1, 137.2, 26, 285/29, 309

[56] References Cited

U.S. PATENT DOCUMENTS

| | | | |
|---|---|---|---|
| 3,527,480 | 9/1970 | Larson | 285/137.1 X |
| 3,602,258 | 8/1971 | Gnavi | 285/137.1 X |
| 4,404,989 | 9/1983 | LeMoine | 285/137.1 X |
| 4,615,546 | 10/1986 | Nash et al. | 285/137.1 X |

FOREIGN PATENT DOCUMENTS 1368039  9/1974  United Kingdom .

*Primary Examiner*—Dave W. Arola
*Attorney, Agent, or Firm*—Woodling, Krost & Rust

[57] ABSTRACT

A device for coupling a plurality of individual couplings includes a nipple plate with a plurality of individual male coupling components and a frame plate with a plurality of the individual female coupling components adapted to be coupled with the male coupling components. The frame and nipple plates are locked together prior to the individual male and female coupling components being coupled or uncoupled.

21 Claims, 9 Drawing Sheets

MULTIPLE COUPLING DEVICE

FIELD OF THE INVENTION

This invention relates to multiple coupling devices and more specifically to multiple coupling devices wherein coupling plates are locked together prior to individual quick disconnect male and female coupling components being coupled to each other.

BACKGROUND OF THE INVENTION

Prior art pipe coupling systems have been used for coupling a plurality of individual couplings, as shown in British Patent Specification No. 1,368,039. These systems are advantageous in that two locking plates, one with a plurality of male coupling members and the other with a plurality of complementary female coupling members, can be pulled together and locked even while being subjected to very large forces. Still these coupling systems are deficient because when the locking plates are subjected to large forces, the forces are transmitted to the individual male and female couplings and cause separation, damage and/or leakage of the coupling members.

OBJECTS AND SUMMARY OF THE INVENTION

It is an object of the present invention to provide an improved multiple coupling device which obviates the problems and limitations of the prior art systems.

It is another object of the present invention to provide an improved multiple coupling device which couples a plurality of male and female coupling elements together without transmitting any significant force between the nipple and coupling plates to which the plurality of male and female coupling components are attached.

It is still another object of the present invention to provide an improved quick multiple coupling device which couples a plurality of male and female quick disconnect coupling elements together.

It is still another object of the present invention to provide an improved multiple coupling device for coupling a plurality of male and female quick disconnect coupling elements that is easy to assemble and relatively inexpensive to manufacture while being sturdy enough to handle rough treatment by equipment operators.

In accordance with the invention, a device for coupling a plurality of individual couplings including male coupling components and complementary female coupling components is provided. The device has a nipple plate with a plurality of individual male coupling components and a frame plate with a plurality of the individual female coupling components adapted to receive and be coupled with the male coupling components. Means are included which lock the frame and nipple plates together prior to the individual male and female coupling components being coupled together. Further, means couple and uncouple the male and female coupling components while the nipple and frame plates are locked together.

Further in accordance with the invention, the means which lock the male and female coupling components together include a plurality of locking shafts projecting outward from the frame plate and a plurality of complementary lock coupling operators which project outward from the nipple plate and receive the locking shafts and lock thereto. The locking shafts have a base section attached to the frame plate, an upper section with a locking recess, and a cam section between the base section and the upper section. The lock coupling operators include detent means for engaging the locking recess and locking the locking shafts within the lock coupling operators whereby the coupling and frame plates are locked to each other. Handle means for disengaging the detent means from the locking recess enable the nipple and frame plates to be uncoupled and separated from each other. The handle means includes first and second handles connected to adjacent lock coupling operators and third and fourth handles secured to the upper surface of the nipple plate to enable an operator to squeeze the first and third handles together and the second and fourth handles together whereby the locking shafts are released from the lock coupling operators and the nipple and frame plates can be uncoupled and separated.

Further in accordance with the invention, the lock coupling operators each include an inner cylindrical member with a bore therethrough to receive the upper section of the sleeve operator with the locking recess; detent means including detent balls carried in the wall of the inner cylindrical member; a biased sleeve shaped element slidingly received within the inner cylindrical member adapted to engage the upper section of the locking shaft; and an outer, spring biased, sleeve shaped lock operator in surrounding relationship to the inner cylindrical member. The lock operator has a locked position wherein the detent balls are engaged with the locking recess in the locking shaft and an unlocked position wherein the detent balls are secured between the biased sleeve shaped element and the sleeve shaped lock operator.

In accordance with the invention, each of the male coupling components has a hollow, cylindrical, male coupling section with a detent receiving groove which projects from a lower surface of said nipple plate. The female coupling components each have a cylindrical coupling section with a bore adapted to receive one of the male coupling components, a spring biased operating sleeve slidingly engaged with the outer surface of the coupling section and ball detents disposed between the coupling section and the operating sleeve to seat within the detent receiving groove when the operating sleeve is moved from an unlocked position into a locking position whereby the male and female coupling sections are locked together.

A coupler plate is located between the frame plate and the nipple plate. The coupler plate has a plurality of female coupling components mounted to it. A sleeve plate is disposed between the coupler plate and the nipple plate is attached to the operating sleeve of the female coupling components to move the operating sleeve into and out of locking engagement with the male coupling components. The sleeve plate has cam engaging surfaces at either end thereof to engage first and second spaced rotary cam shafts, respectively, and move the sleeve plate between a first position where the operating sleeve is in unlocked engagement with the male coupling components and a second position where the operating sleeve is in locked engagement with the male coupling members. The means for locking the frame and nipple plates together also includes a coupler plate located between the sleeve plate and the frame plate for movement from a first position against the frame plate to a second position where the male and female coupling components are positioned to be coupled together. The coupler plate engages the first and second rotary cam shafts to move the sleeve plate between a first position where the operating sleeves are not in locking engagement with the male coupling members and a second position where the operating sleeves are in locking engagement with the male coupling components. The rotary cam shafts have first and second cam operating sections thereon whereby rotation of the cam shafts first raises the coupling plate towards the nipple plate to place the male and female coupling components in a position to be coupled together and then raises the sleeve plate to the second position where the operating sleeve is in locking engagement with the male coupling components.

Also in accordance with the invention, lock housings are secured to the coupler plate having cylindrical bores which slidingly receive the locking shafts so that the cam shaft sections of the locking shafts are located within the lock housings. The lock housings have a horizontal bore which rotatably secure the ends of the rotary shafts so that rotation of the cam shafts causes the first cam operating section of the shafts to engage the cam shaft sections of the locking shafts and move the lock housings away from the frame plate and toward the nipple plate.

BRIEF DESCRIPTION OF THE DRAWINGS

The structure, operation, and advantages of the presently preferred embodiment of the invention will become further apparent upon consideration of the following description taken in conjunction with the accompanying drawings, wherein.

DETAILED DESCRIPTION OF THE INVENTION

Figure 1:
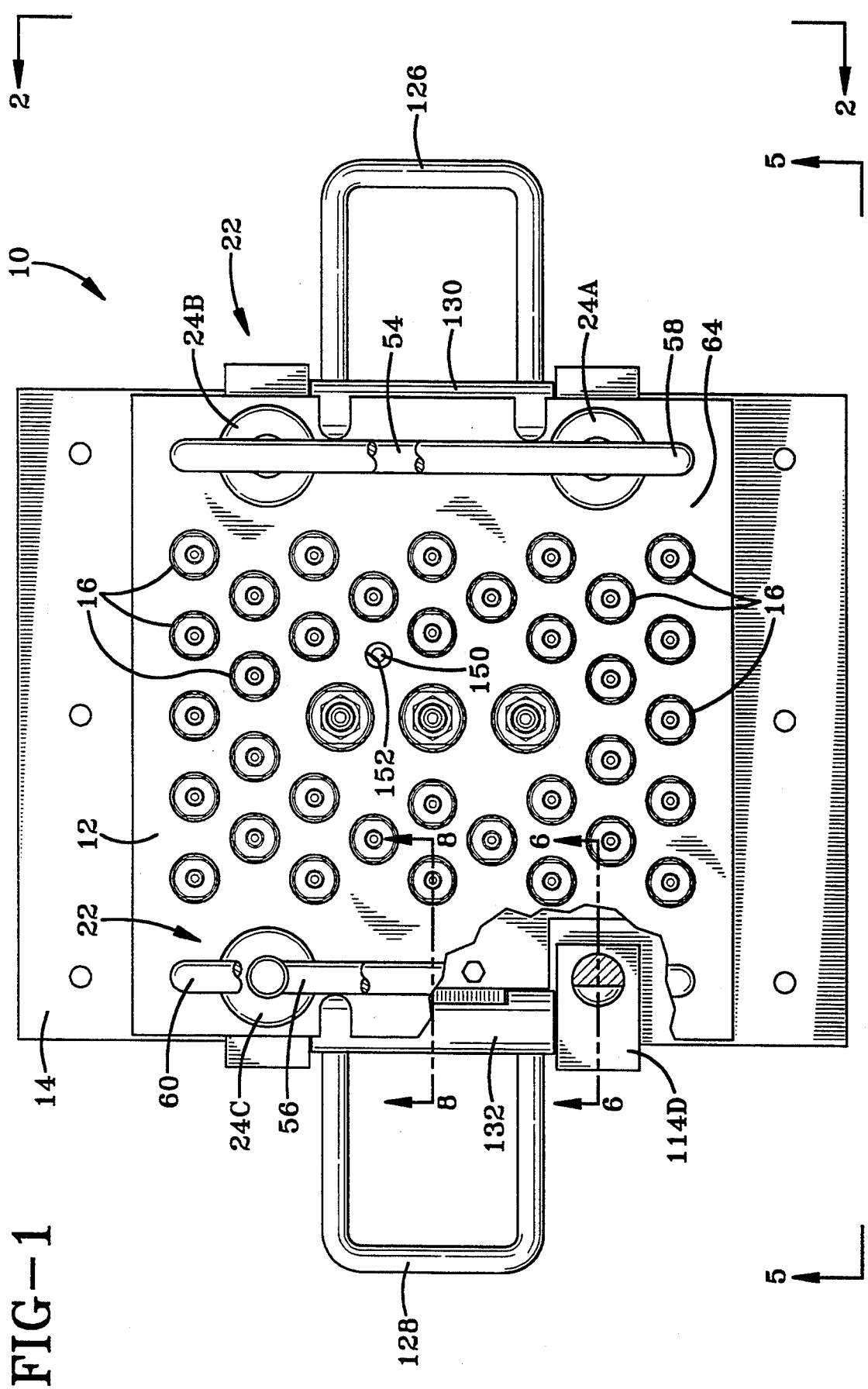
FIG. 1 is a top view of a nipple plate having a plurality of individual male coupling elements and lock coupling operators to couple the male coupling elements with female coupling elements secured to a frame plate, in accordance with the present invention.
Figure 2:
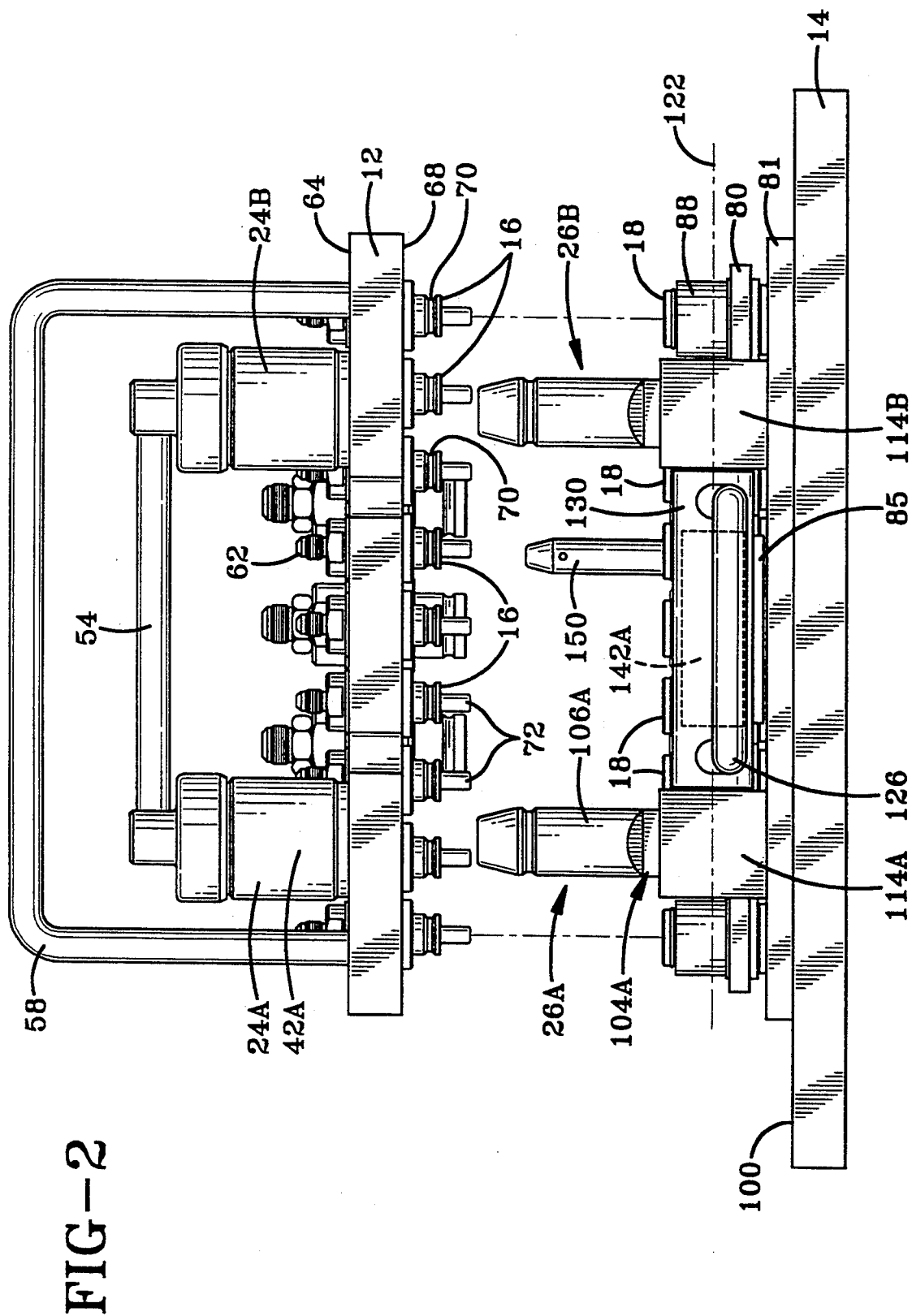
FIG. 2 is a view taken along line 2—2 of FIG. 1 illustrating the nipple and frame plates prior to being secured to each other.

Referring to FIGS. 1 and 2, there is illustrated a multiple coupling system 10 wherein nipple and frame plates 12 and 14, respectively, are locked together prior to individual male and female coupling components 16 and 18, respectively, of a plurality of individual couplings 20 being coupled together. In operation, the nipple plate 12 is typically secured to the ends of a plurality of hoses and electric lines (not shown) which are coupled through fluid and electrical couplings to a supply of gas, fluid and/or electricity for delivery to the hose and electric lines. The multi-coupling system 10 is particularly useful for offshore applications, such as connecting a plurality of high pressure hoses to deep underwater locations. Under these circumstances, the weight of the hoses prevents the nipple plate from being easily mounted to the frame plate. While a power winch can be used to pull the nipple plate to the frame plate so that they can be locked to each other, the forces from the drag of the hoses (which can reach 10 or more tons) can load the individual couplings with a large force resulting in leakage and/or physical damage to the couplings. The multi-coupling system 10 is also adaptable for other industrial applications relating to automotive, machine tools, petrochemical, testing and medical equipment.

Referring to FIGS. 1, 2, 3, and 4, nipple plate 12 is illustrated in several positions relative to frame plate 14. The nipple plate 12 is generally rectangular and has a plurality of the male coupling components 16 extending therethrough and positioned to couple with cooperating female coupling components 18 carried on the coupler plate 81. As discussed in more detail below, when a male coupling component 16 is securely coupled within a cooperating female coupling component 18, conventional self closing valves in either or both the male and female coupling components, are opened to permit flow therethrough.

An important aspect of the invention relates to the means 22 for locking the nipple and frame plates 12 and 14 together in an assembled condition. Means 22 includes four lock coupling operators 24A, 24B, 24C, and 24D (24A-24D) secured to nipple plate 12 and cooperating locking shafts 26A, 26B, 26C, and 26D (26A-26D) projecting outward from frame plate 14. Each of the lock coupling operators 24A-24D and its cooperating locking shaft 26A-26D, respectively, is essentially identical and therefore the details of only lock coupling operator 24A and its associated locking shaft 26A are discussed in detail herein below.

Figure 3:
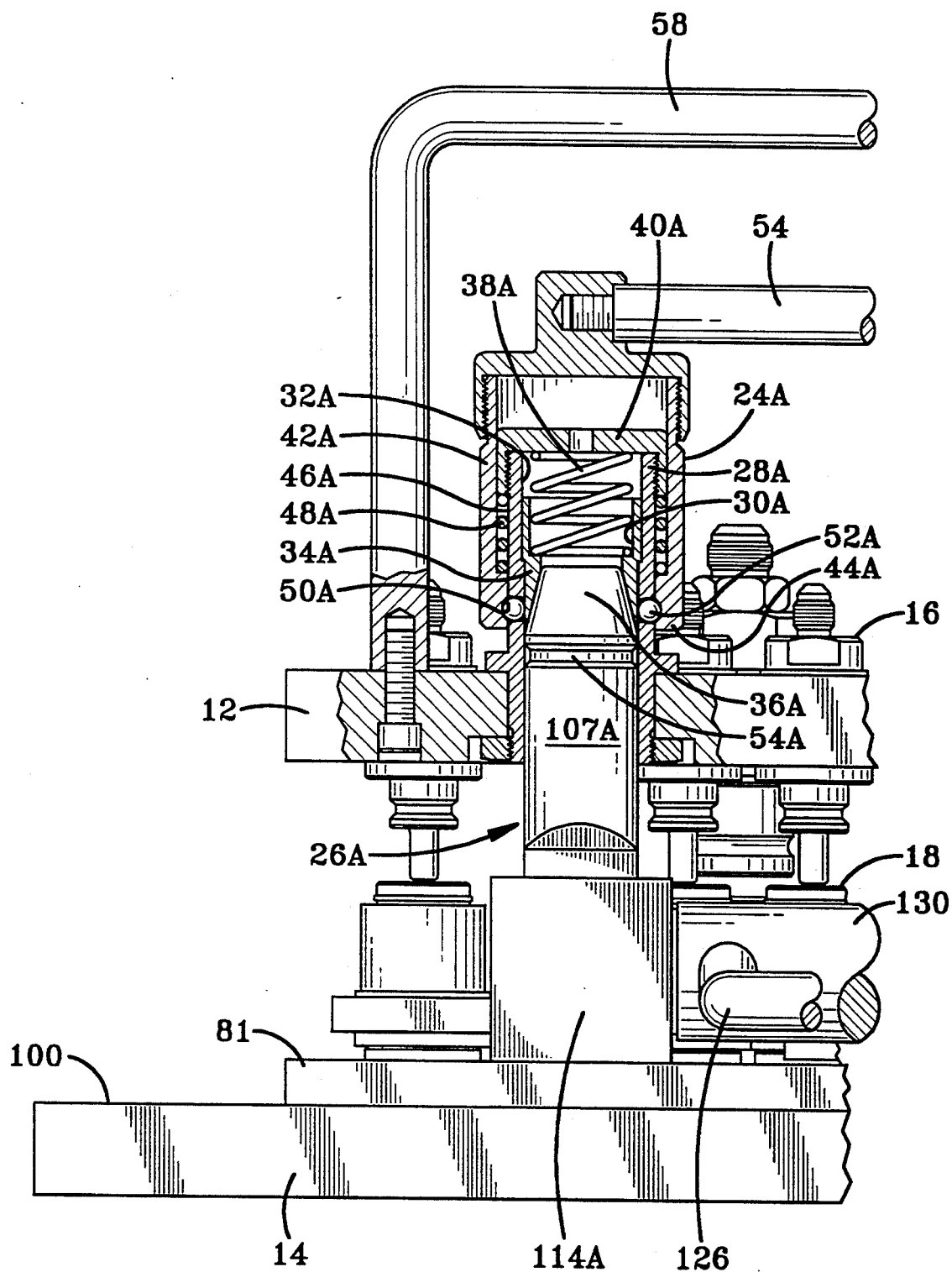
FIG. 3 is an enlarged view of a locking shaft, projecting, from the frame plate inserted within a lock coupling operator secured to the nipple plate but prior to locking the shaft within the coupling operator.

Lock coupling operator 24A has an inner cylindrical member 28A with a bore therethrough which is securely mounted to nipple plate 12 and which is adapted to receive cooperating locking shaft 26A. A sleeve shaped, biased element 30A is slidingly engaged with the inner wall 32A of the bore through member 28A. Sleeve element 30A has an outwardly bevelled, end section 34A which is operatively engaged by the free end 36A of locking shaft 26A. Sleeve element 30A is biased downward by a spring 38A which is compressed and secured within an upper end of cylindrical member 28A by a removable end cap 40A. Lock coupling operator 24A also includes an outer, sleeve shaped lock operator 42A disposed in surrounding relationship to inner cylindrical member 28A. A detent operating section 44A at the lower end of lock operator 42A surrounds and is in sliding contact with the outer surface 46A of cylindrical member 28A. Detent operating section 44A is normally biased downwards in an unlocked position, as illustrated in FIG. 3, by a spring 48A disposed in a cylindrical space between lock operator 42A, outer surface 46A of cylindrical member 28A, detent operating section 44A, and end cap 40A. Detent operating section 44A includes a detent receiving groove 50A which receives ball detents 52A carried in the wall of cylindrical member 28A when the detents 52A are urged radially outward under the bias force exerted by bevelled end section 34A of inner cylindrical member 28A. In the locking position, the inner surface of detent operating section 44A presses the detent balls 52A into a groove 54A about the free end of locking shaft 26A, as illustrated with an arrow in FIG. 4, to securely lock the locking shaft 26A to lock coupling operator 24A. While the detents are illustrated as balls, it is within the scope of the invention to use any type of conventional detents.

Means 22 also includes first and second handles 54 and 56 which are secured at either end to lock coupling operators 24A,24B and 24C,24D, respectively. Handles 54 and 56 are spaced below third and fourth U-shaped handles 58 and 60, respectively, that are secured to the upper surface 64 of nipple plate 12. The relative location of the handles 54 and 56 to the U-shaped handles 58 and 60 enables an operator to squeeze handles 54 and 58 together with one hand while squeezing handles 56 and 60 together with the other hand. As handles 54 and 56 are moved away from nipple plate 12, the locking shafts 26A–26D are released from lock coupling operators 24A–24D and the nipple plate 12 and frame plate 14 can be separated and uncoupled, as discussed in more detail below.

The plurality of individual couplings 20 are coupled and uncoupled subsequent to the separating and coupling of nipple plate 12 and frame plate 14, as discussed below. The male coupling components 16 are mounted to nipple plate 12 in a conventional manner so that a threaded connector 62 extends outward from upper surface 64 of nipple plate 12 for connection to a hose (not shown). Male coupling components 16 have a hollow, cylindrical, male coupling section 66, see FIGS. 6–9, which projects downward from lower surface 68 of nipple plate 12. Coupling section 66 has a detent receiving groove 70 and a nipple nose 72 to engage and seal in female coupling component 18, as is conventionally known in the prior art. It is also within the terms of the invention to provide a normally closed valve in the male coupling component where required.

Figure 6:
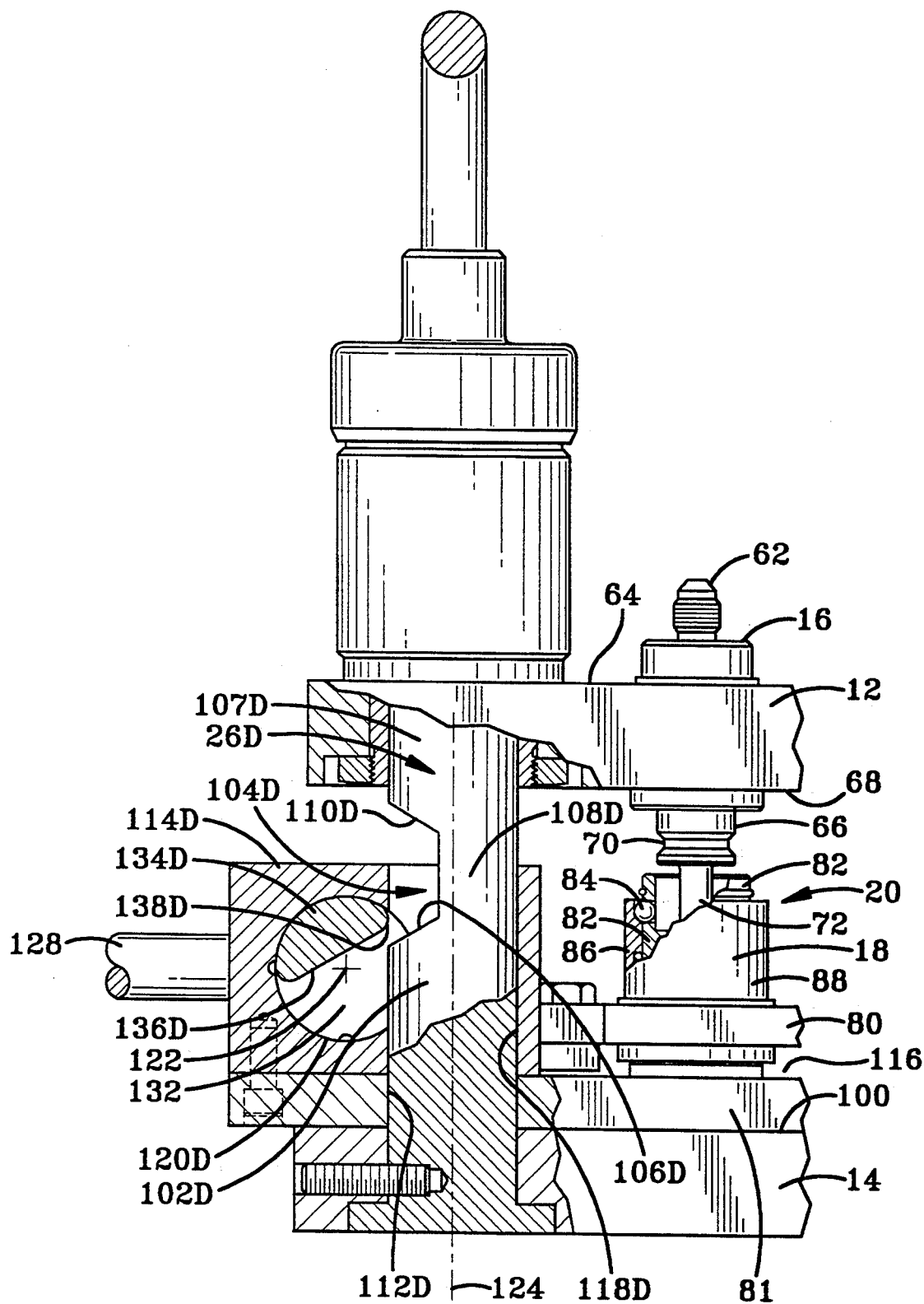
FIG. 6 is an enlarged, cross-sectional view taken along line 6—6 of FIG. 1, illustrating a first cam operator in operative relationship with the locking shaft for allowing the movement of a sleeve plate to couple and uncouple each of the male and female coupling components of the plurality of coupling components.
Figure 7:
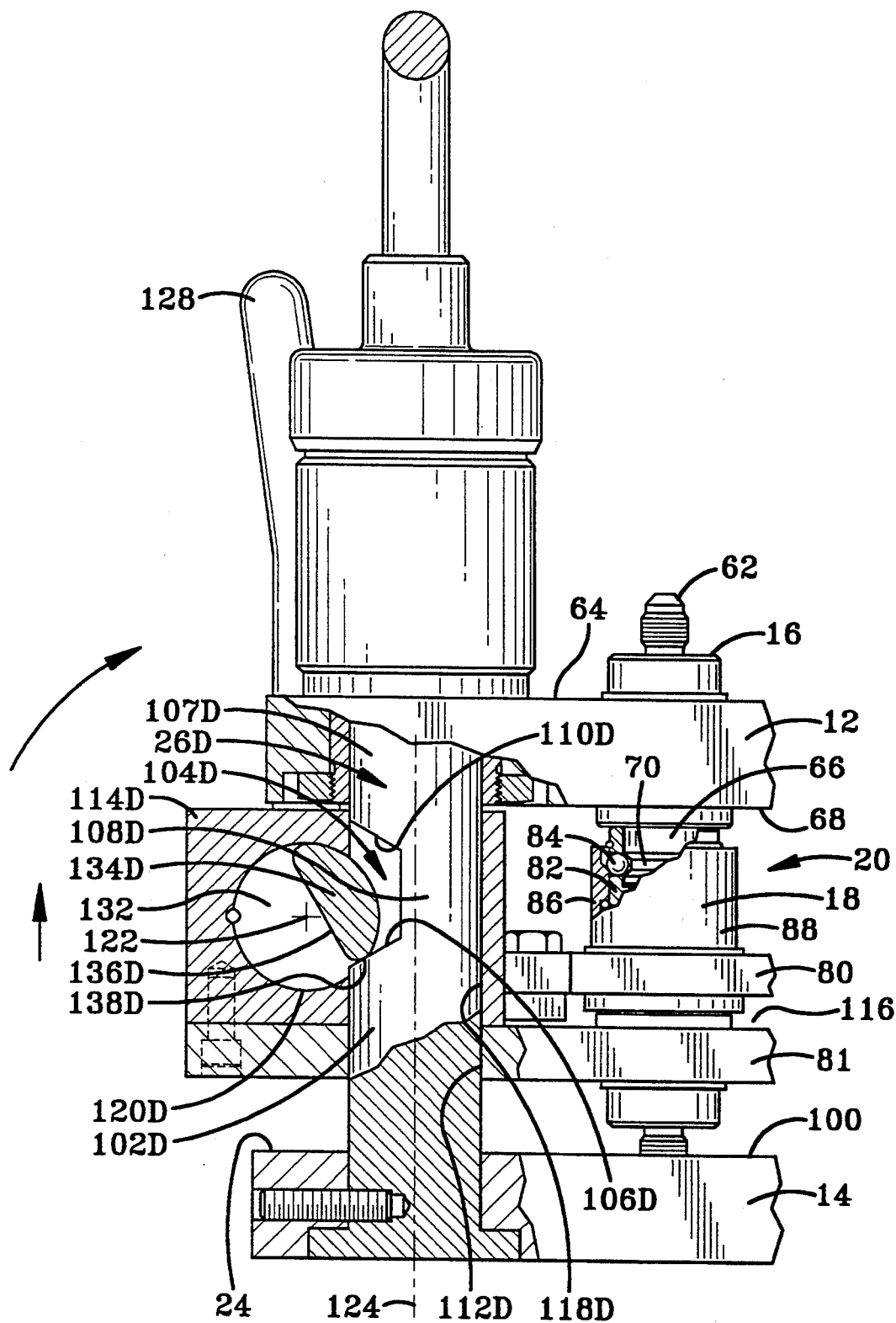
FIG. 7 is the same as FIG. 6 except that the first cam operator is illustrated in a coupling position with respect to the locking shaft and the sleeve plate is disposed so that the male and female coupling components are partially coupled together.
Figure 8:
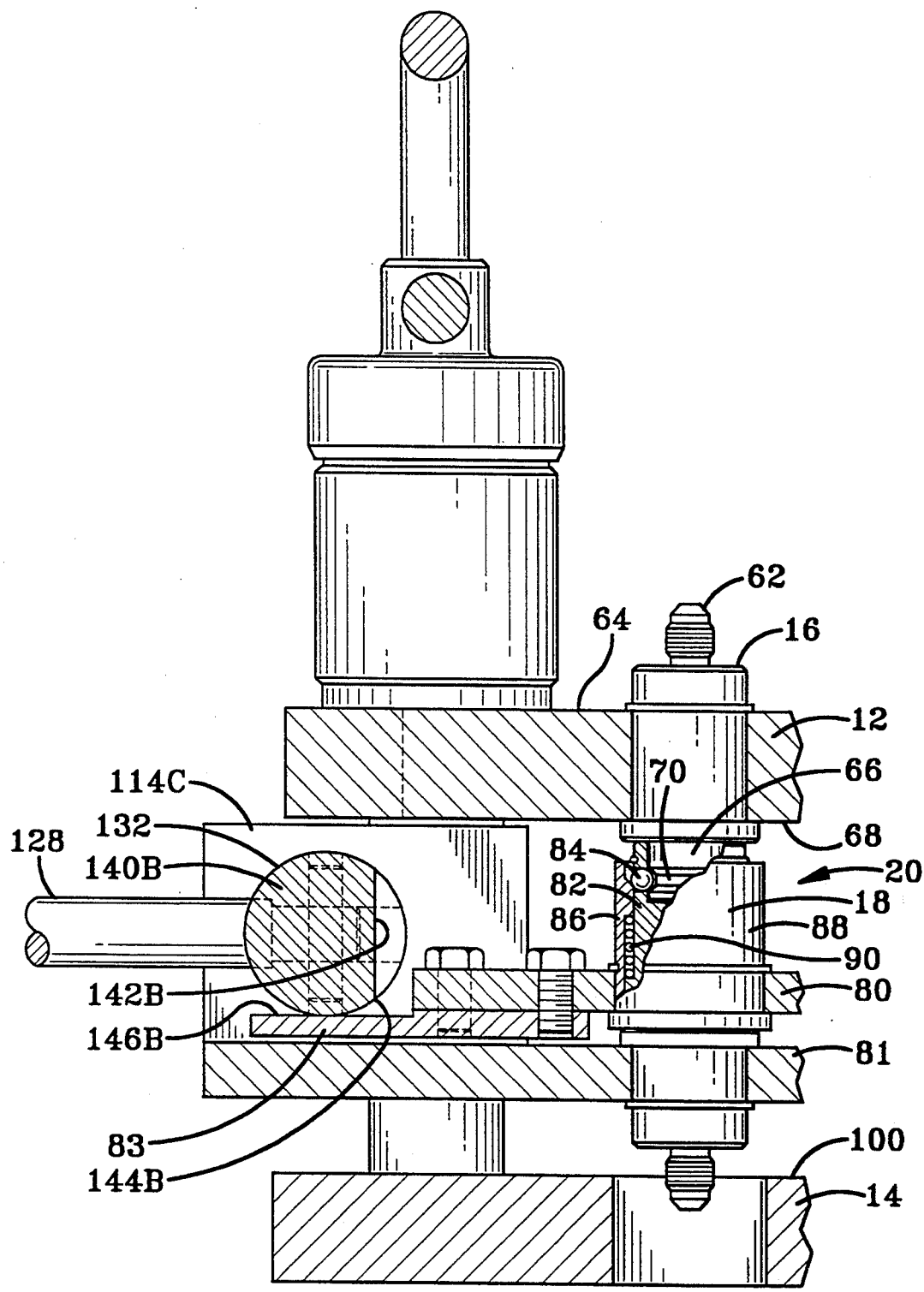
FIG. 8 is an enlarged, cross-sectional view taken along line 8—8 of FIG. 1 illustrating a second cam operator, for moving the sleeve plate, in a position where the male and female coupling components are still uncoupled; and, FIG. 9 is the same as FIG. 8 except that the second cam operator is illustrated in a position where the male and female coupling components are coupled together.

The female coupling component 18, as illustrated in FIGS. 6–8, has a cylindrical female coupling section 82 with a bore to receive cylindrical male coupling section 66 of the male component 16. Ball detents 84 are disposed in the side wall of female coupling section 82 and secured therein by a detent engaging section 86 at the upper end of female operating sleeve 88. Sleeve 88 is slidingly engaged with the outer surface of female coupling section 82. The sleeve 88 is normally biased upwards, as illustrated in FIG. 8, by a spring 90 disposed in a space between sleeve 88 and the outer surface of female coupling section 82. Sleeve 88 has a detent receiving groove in the detent engaging section which provides a seat for ball detents 84 carried in the wall of coupling section 82 when the detents are pushed radially outward under the force exerted by the insertion of male coupling section 66 into the bore of the cylindrical female coupling section 82 to lock the male and female coupling sections together, as discussed in more detail below.

Figure 9:
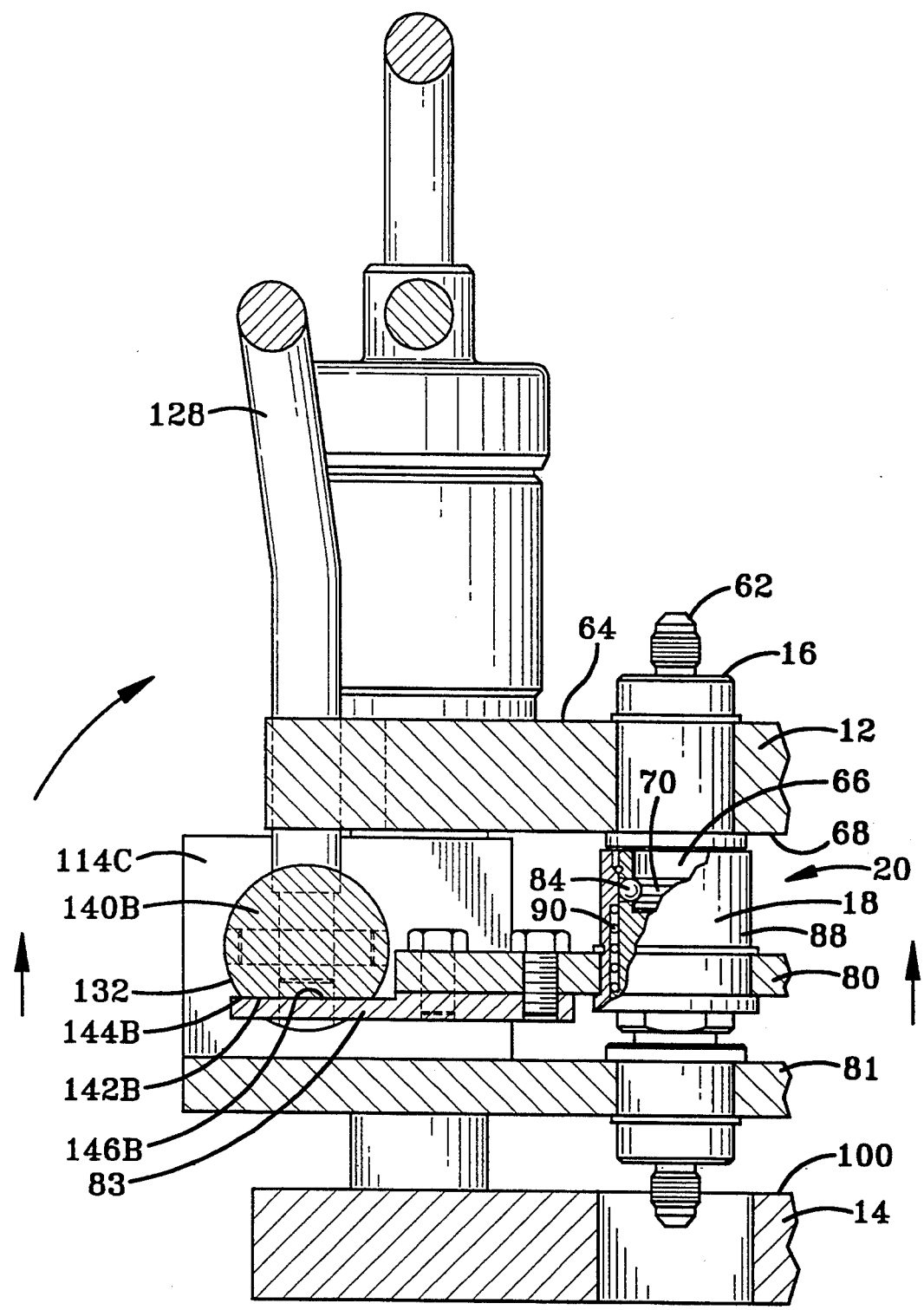

The female coupling components 18, are securely mounted to coupler plate 81 located between the nipple plate and the frame plate. Sleeve plate 80 has opposite cam operating ends 83 and 85 disposed between locking shafts 26A,26B and 26C,26D, respectively, as illustrated in FIGS. 2, 8 & 9, which coact with cam operators, as discussed below, to move sleeve plate 80 from a first position where the female operating sleeve 88 is in an unlocked condition to a second position where the operating sleeve is in a locked condition.

As illustrated in FIGS. 2, 3, 4, 6, and 7, the frame plate 14 is generally rectangular and has four substantially identical locking shafts 26A, 26B, 26C, and 26D positioned at the corners thereof and projecting upward from the upper surface 100. Locking shaft 26D is generally cylindrical and has a base section 102D, as seen in FIGS. 6 and 7, secured by means such as a threaded screw to frame plate 14. Locking shaft 26D has a cam section 104D located between base section 102D and an upper section 107D. Cam section 104D includes a lower surface 106D which engages and coacts with a cam operating section 134D of a cam shaft 132. Cam section 104D further includes an upper surface 110D which does not coact with said cam operating section 134D. Cam section 104D is, essentially, a notch in rod 108D. Upper section 107D has a circular locking recess (see 54A in FIG. 4) and a free end which is bevelled to allow for ease of insertion into the cooperating bore through inner cylindrical member 28D, as discussed in more detail below.

A coupler plate 81 is located between the sleeve plate 80 and the frame plate 14. The coupler plate 81 is generally rectangular and has four cylindrical bores 112A, 112B, 112C, and 112D at each corner which slidingly receive locking shafts 26A–26D, respectively. The locking shafts guide the coupler plate in the latter movement upward and away from its resting position against the frame plate towards the nipple plate and a coupling position where the male and female coupling components are positioned to be coupled together.

Block shaped, lock housings 114A, 114B, 114C and 114D, are secured to the upper surface 116 of coupler plate 81. The lock housings 114A–114D each have a vertical bore 118A, 118B, 118C and 118D therethrough which is aligned at its lower end with a complementary cylindrical bore 112A–112D. The lower end of bore 118D slidingly receives the base section 102D of locking shaft 26D, as illustrated in FIGS. 6 and 7, while the upper end of bore 118D slidingly receives the free end 36D of locking shaft 26D. Lock housing 114D has a horizontal bore 120D about a centerline 122 through the housings 114A and 114B, see FIG. 2, which is offset from the centerline 124 through bore 112D, see FIG. 7. Lever arms 126 and 128, forming hooped shaped handles on opposite sides of coupler plate 81, are operatively attached to identical rotary cam operating shafts 130 and 132, respectively, as seen in FIG. 1. The description and operation of only cam shaft 132 is described herein since cam shaft 130 is identical in structure and operation. Cam shaft 132 has a cam operating section 134D with a flat face 136D and a curved projection 138D at one end to coact with the upper section 106D of cam section 104D of locking shaft 26D. As the lever arm 128 is rotated from a horizontal position, as illustrated in FIG. 6, where the coupler plate is seated against the frame plate 14 to the vertical position, as illustrated in FIG. 7, the projection 138D engages surface 106D and raises the block 114D to a valve coupling position, as described in more detail below.

The cam shafts 130 and 132 have identical cam operating sections 140A and 140B, respectively, see FIGS. 8 and 9, which is between cam operating sections 134A,134B and 134C,134D. Cam operating section 140B has a flat face 142B and an edge projection 144B to coact with the upper end surface 146B of end 83 of sleeve plate 80. As the lever arm 128 is moved from a horizontal position, where the sleeve plate 80 locates the operating sleeve 88 in the unlocked position, to the vertical position, the flat surface 142B moves into contact with surface 146B of end portion 83 of sleeve plate 80. Then, spring 90 in female coupling component 18 urges the upper surface 146B of sleeve plate 80 into contact with the flat surface 142B of cam operating section 140B. In this configuration, the female coupling component 18 is coupled to the male coupling component 16, as illustrated in FIG. 9. While the sleeve plate 80 is illustrated as having ends 83 and 85 attached by bolts to both ends of sleeve plate 80, it is within the terms of the invention to form the sleeve plate from an integral piece of material.

To insure that the nipple plate is properly oriented with the frame plate, an alignment pin 150 is secured to and projects outward from frame plate 14. The pin is adapted to be received in a through bore 152 extending through nipple plate 12. The alignment pin 150 and bore 152 are positioned at a location offset from the center of nipple plate 12 so that the nipple plate can only be oriented one way with respect to the frame plate. This is important to insure that the male and female coupling components are properly matched.

Figure 4:
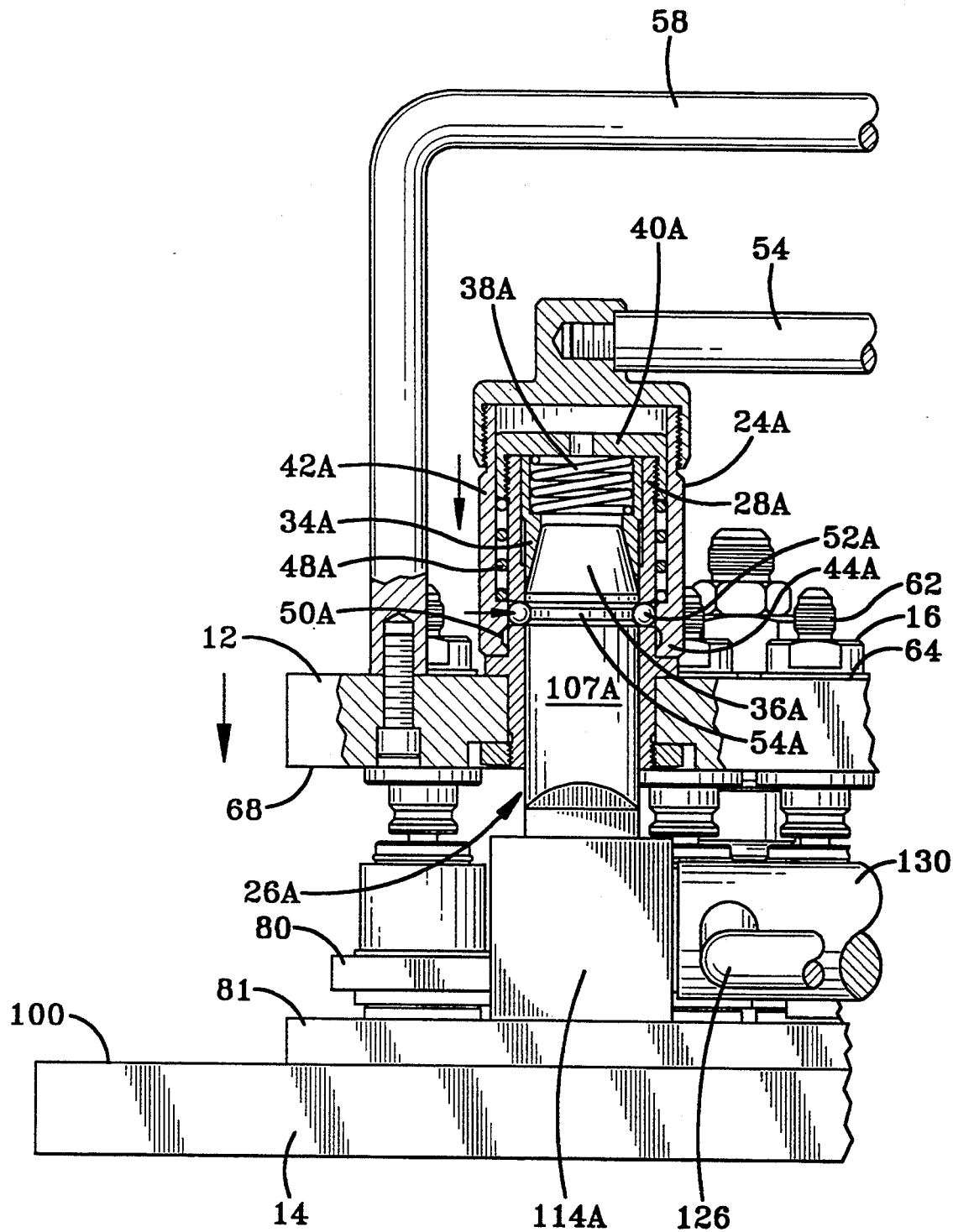
FIG. 4 is an enlarged view of the locking shaft inserted within the coupling operator, as illustrated in FIG. 3, but subsequent to locking the shaft within the bore.

In operation the multiple coupling system 10 is assembled and operated by an operator initially grasping handles 58 and 60 of the nipple plate 12 and aligning the four locking shafts 26A–26D with the cooperating bores of inner cylindrical member 28A–28D, respectively. At the same time, pin 150 is aligned with bore 152 to insure that the nipple and frame plates are properly oriented before being pressed together. Then, nipple plate 12 is pushed towards the frame plate 14 so that the free ends of locking shafts 26A–26D move into their cooperating bore within lock coupling operators 24A–24D to engage the end sections 34A–34D of inner cylindrical members 32A–32D. As the nipple plate 12 is pushed closer towards frame plate 14, the inner cylindrical members are forced against the bias of springs 38A–38D towards the end caps 40A–40D until the detent grooves 54A–54D are aligned with the detent balls 52A–52D. Then, the springs 48A–48D push the lock operators 42A–42D downwards, as illustrated in FIG. 4, so that the detents 52A–52D are secured by the lock coupling operators 42A–42D in the detent grooves 54A–54D.

Throughout the operation of mounting and dismounting the nipple plate to and from the frame plate 14, as just described, individual couplings 20 remain uncoupled with the male coupling components 16 disengaged, and preferably free of contact, from the female coupling components 18. This is an important aspect of the invention since it reduces the forces on the individual couplings 20. Individual couplings 20, as previously stated, typically conduct fluid. The individual couplings 20, in the present invention, do not bear any of the forces in regard to the connection of the nipple plate 12 to the frame plate 14.

The individual couplings 20 in the present invention can carry fluids at much higher pressure without leakage. This is because the locking shafts 26A–D and the lock coupling operators 24A–D support all forces and moments in all directions.

Figure 5:
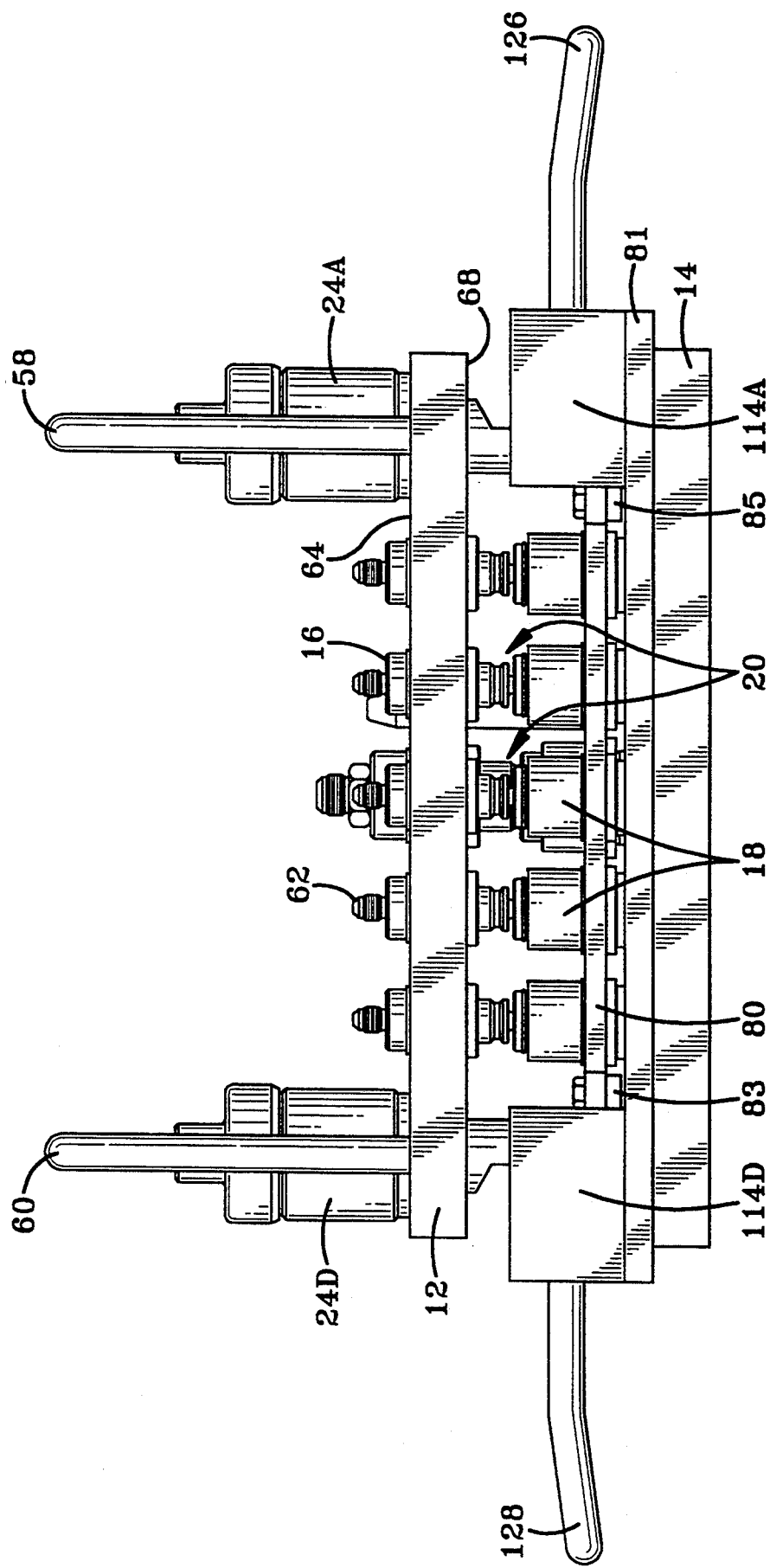
FIG. 5 is a view taken along line 5—5 of FIG. 1 illustrating the nipple and frame plates subsequent to being secured to each other but prior to the individual male and female coupling components being coupled to each other.

Next, the operator rotates the lever arms 126 and 128 from the horizontal position, as illustrated in FIGS. 5 and 6, to the vertical position as illustrated in FIGS. 7–9. The cam operating sections 134A–134D engage the surfaces 106A–106D of locking shafts 26A–26D and raise the coupling plate 81 upward and away from the upper surface 100 of frame plate 14. The coupling plate 81, which is secured to female coupling components 18, as illustrated in FIG. 9, concurrently moves upward into coupling engagement with male coupling components 16 so that the male coupling sections 66 are seated within the female coupling section 82. The male coupling components 66 enter the bores of female coupling sections 82. When the second cam sections 140A and 140B are in the position as illustrated in FIGS. 8 and 9, the sleeve operating plate 80 moves upward towards the nipple plate 12 under the urging of springs 90. The upward movement of sleeve 88 forces the detent balls 84 to move radially inward into seating engagement with the detent securing grooves 70 whereby the male components 16 are securely coupled to the female component 18 of coupling 20.

To disconnect the nipple plate 12 from the frame plate 14, the operator first rotates lever arms 126 and 128 from the vertical position, as illustrated in FIGS. 7 and 9 to the horizontal position as illustrated in FIGS. 5, 6 and 8. This action moves female coupler sleeves 88 to a location where the detent balls 84 are free to move radially outward, out of engagement with grooves 70, as the female coupler components 18 are withdrawn from the male coupling components 16. Prior to disconnection, it may be desirable to release any residual pressure from within the upstream or downstream lines connected to the individual couplers 20.

To completely disengage the nipple plate 12 from the frame plate 14, the operator squeezes together the two pairs of adjacent handles 54, 58 and 56, 60, respectively, so that the sleeve shaped lock operators 42A–42D move upwards against the bias of springs 48A–48D and allow the detents 52A–52D to move outwardly into the detent grooves 50A–50D in operating sections 44A–44D. Then, the operator pulls the nipple plate 14 away from the frame plate 14 so that the locking shafts 26A–26D are withdrawn from the lock coupling operators 24A–24D. Concurrently, the inner cylindrical members 34A–34D are biased downwards by springs 38A–38D to secure the detent balls 52A–52D in their unlocked position, as illustrated in FIG. 3, and the nipple plate 12 can be completely moved away from frame plate 14.

It is apparent that there has been provided in accordance with this invention a multiple coupling device wherein the coupling plates are locked together prior to individual male and female coupling components being coupled to each other so that the force exerted on the individual coupling components is significantly reduced.

While the invention has been described in combination with embodiments thereof, it is evident that many alternatives, modifications, and variations will be apparent to those skilled in the art in light of the foregoing description. Accordingly, it is intended to embrace all such alternatives, modifications and variations as fall within the spirit and scope of the appended claims.

What is claimed:

1. A device for coupling a plurality of individual couplings, said individual couplings including male coupling components and complementary female coupling components, comprising:
   a nipple plate having a plurality of said individual male coupling components;
   a frame plate having a plurality of said individual female coupling components adapted to receive and be coupled with said male coupling components;
   means for locking said frame and nipple plates together prior to said individual male and female coupling components being coupled together; and
   means for coupling and uncoupling said male and female coupling components while said nipple and frame plates are locked together.

2. The coupling device of claim 1 wherein said means for locking includes a plurality of locking shafts projecting outward from said frame plate and a plurality of complementary lock coupling operators projecting outward from said nipple plate and adapted to engage said locking shafts and lock thereto.

3. The coupling device of claim 2 wherein:
   said locking shafts have a base section attached to said frame plate, an upper section with a locking recess, and a cam section between said base section and said upper section; and
   said lock coupling operators include detent means for engaging said locking recess and locking said locking shafts within said lock coupling operators whereby said nipple and frame plates are locked to each other.

4. The coupling device of claim 3 further including handle means for disengaging said detent means from said locking recess whereby said nipple and frame plates can be uncoupled and separated from each other.

5. The coupling device of claim 4 wherein said handle means includes first and second handles connected to adjacent lock coupling operators and third and fourth handles secured to the upper surface of said nipple plate to enable an operator to squeeze said first and third handles together and said second and fourth handles together whereby said locking shafts are released from said lock coupling operators and said nipple and frame plates can be separated and uncoupled.

6. The coupling device of claim 5 wherein said lock coupling operators include:
   an inner cylindrical member with a bore therethrough to receive said upper section of said locking shafts with said locking recess;
   detent means including detent balls carried in the wall of said inner cylindrical member;
   a biased sleeve shaped element slidingly received within said inner cylindrical member adapted to engage said upper section of said locking shaft;
   an outer, spring biased, sleeve shaped lock operator disposed in surrounding relationship to said inner cylindrical member having a locking position wherein said detent balls are engaged with said locking recess in said locking shaft; and
   an unlocked position wherein said detent balls are secured between said biased sleeve shaped element and said sleeve shaped lock operator.

7. The coupling device of claim 2 wherein said male coupling component has a cylindrical male coupling section with a detent receiving groove which projects from a lower surface of said nipple plate.

8. The coupling device of claim 7 wherein said female coupling component has a cylindrical coupling section with a bore adapted to receive said male coupling component, a spring biased operating sleeve slidingly engaged with the outer surface of said cylindrical coupling section and detents disposed between said cylindrical coupling section and said operating sleeve to seat within said detent receiving groove when said operating sleeve is moved into a locking engagement to lock said male and female coupling components together in a coupled condition.

9. The coupling device of claim 8 further including a sleeve plate disposed between said frame plate and said nipple plate and attached to said cylindrical operating sleeve to move said operating sleeve into and out of locking engagement with said male coupling components.

10. The coupling device of claim 9 wherein said sleeve plate has cam engaging surfaces at either end thereof adapted to engage first and second spaced rotary cam shafts and move said sleeve plate between a first position where said operating sleeve is not in locking engagement with said male coupling components and a second position where said operating sleeve is in locking engagement with said male coupling components.

11. The coupling device of claim 10 wherein said means for locking said frame and nipple plates together includes a coupler plate located between said sleeve plate and said frame plate for movement from a resting position against said frame plate to a coupling position where said male and female coupling components are positioned to be coupled together.

12. The coupling device of claim 11 including an alignment pin secured to said frame plate adapted to be received in a bore through said nipple plate to orient said nipple and frame plates with respect to each other.

13. The coupling device of claim 1 wherein said male coupling component has a hollow, cylindrical, male coupling section with a detent receiving groove which projects from a lower surface of said nipple plate.

14. The coupling device of claim 13 wherein said female coupling component has a cylindrical coupling section with a bore adapted to receive said male coupling component, a spring biased operating sleeve slidingly engaged with the outer surface of said cylindrical coupling section and detents disposed between said cylindrical coupling section and said operating sleeve to seat within said detent receiving groove when said operating sleeve is moved into locking engagement whereby said male and female coupling components are locked together in a coupled condition.

15. The coupling device of claim 14 further including a sleeve plate disposed between said frame plate and said nipple plate and attached to said cylindrical operating sleeve to move said operating sleeve of said female coupling members into and out of locking engagement with said male coupling components.

16. The coupling device of claim 15 wherein said sleeve plate has cam engaging surfaces at either end thereof adapted to engage first and second, spaced rotary cam shafts and move said sleeve plate between a first position where said operating sleeve is not in locking engagement with said male coupling components and a second position where said operating sleeve is in locking engagement with said male coupling components.

17. The coupling device of claim 16 wherein said means for locking said frame and nipple plates together includes a coupler plate located between said sleeve plate and said frame plate for movement from a resting position against said frame plate to a coupling position where said male and female coupling components are positioned to be coupled together.

18. The coupling device of claim 17 further including lock housings secured to said coupler plate having cylindrical bores which slidingly receive said locking shafts so that said cam shaft sections of said locking shafts are located within said lock housings, said lock housings having a horizontal bore which rotatably secure the ends of said rotary shafts so that rotation of said cam shafts causes the first cam operating section of said shafts to engage the cam shaft sections of said locking shafts and move said lock housings toward said nipple plate and away from said frame plate.

19. The coupling device of claim 17 wherein said coupler plate engages said first and second rotary cam shafts to move said sleeve plate between said first position where said operating sleeve is not in locking engagement with said male coupling components and said second position where said operating sleeve is in locking engagement with said male coupling components.

20. The coupling device of claim 19 wherein said rotary cam shafts have first and second cam operating sections thereon whereby rotation of said cam shafts initially causes said first cam operating sections to raise said coupling plate to said coupling position where said male and female coupling components are positioned to be coupled together and then raises said sleeve plate to said second position where said operating sleeve is in locking engagement with said male coupling components.

21. The coupling device of claim 20 wherein said means for coupling and uncoupling said male and female coupling components includes lever arms operatively attached to said rotary cam shafts to rotate said cam shafts.

* * * * *